July 2, 1940.  J. NELSON  2,206,789
ARTIFICIAL FISH LURE
Filed July 10, 1939
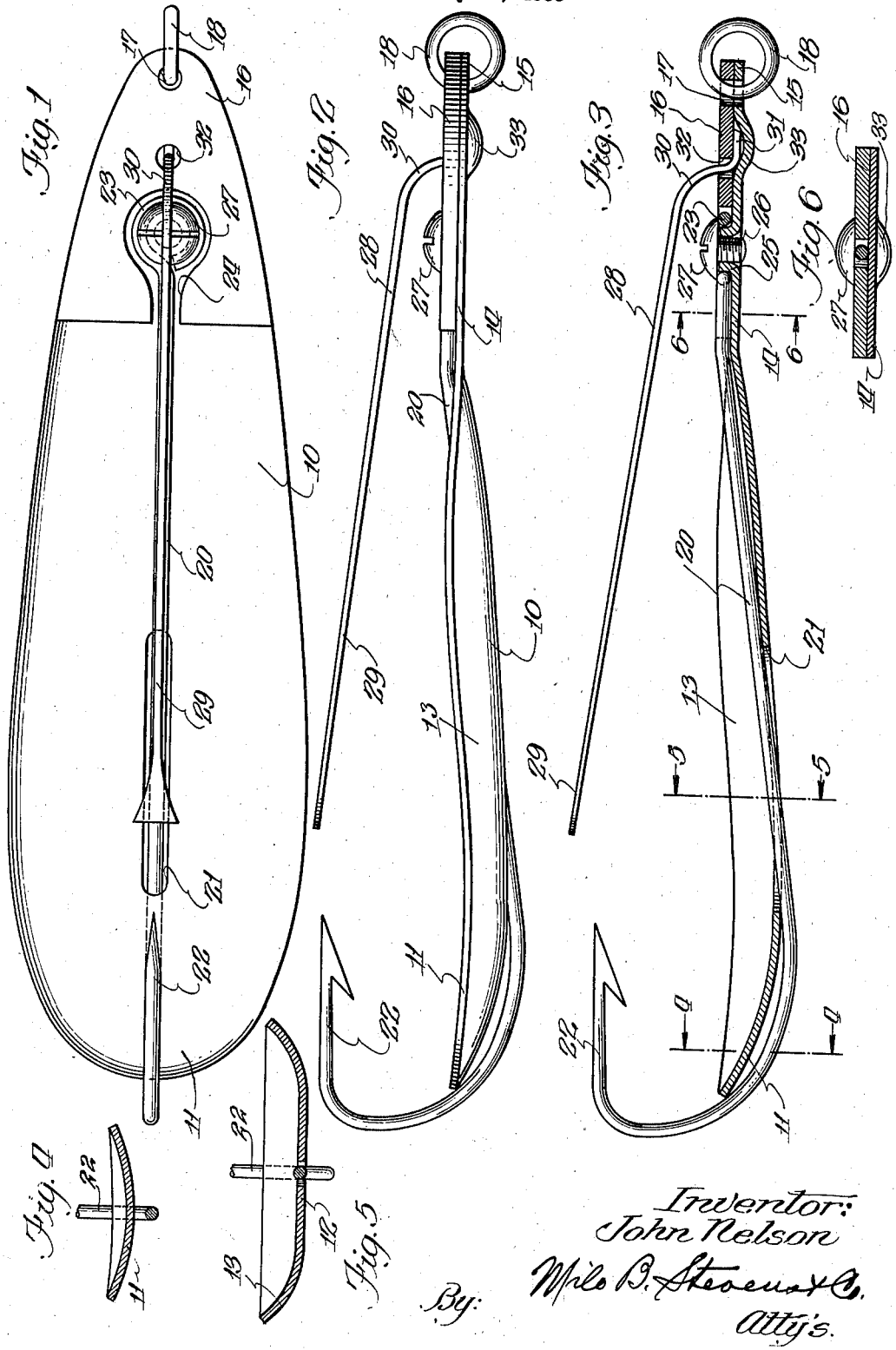
Inventor:
John Nelson
By: Milo B. Stevens & Co.
Att'ys.

Patented July 2, 1940

2,206,789

UNITED STATES PATENT OFFICE 2,206,789

ARTIFICIAL FISH LURE

John Nelson, Chicago, Ill.

Application July 10, 1939, Serial No. 283,676

6 Claims. (Cl. 43—45)

My invention relates to artificial fish lures of the spoon type, and has for its main object to provide a lure with means to induce an oscillating and rolling action as the lure is drawn through the water, whereby to simulate the movement of a minnow.

A further object of the invention is to include in the forward end portion of the lure a flat weighted portion which checks tendencies to roll the lure completely over or spin the same.

A still further object of the invention is to develop the spoon portion of the lure with definite characteristics of formation to induce the oscillating and rolling actions previously mentioned.

Another object of the invention is to construct the main portion of the lure of sheet material and provide a peculiar and efficient securing means for the hook which is associated with the lure.

An additional object of the invention is to attach a weed guard to the lure in a simple and efficient manner.

An important object of the invention is to design the novel lure with parts which are few and simple, so that it may be economically produced, easily assembled and durable over a long period of use.

With the above objects in view, and any others which may suggest themselves from the description to follow, a better understanding of the invention may be had by reference to the accompanying drawing, in which—

Fig. 1 is a magnified top plan view of the novel lure;

Fig. 2 is a side elevation;

Fig. 3 is a longitudinal section; and

Figs. 4, 5 and 6 are, respectively, sections on the lines 4—4, 5—5 and 6—6 of Fig. 3.

Many developments have appeared in late years in the field of spoon-type artificial fish lures, but the forms which have come to my attention have been with designs which were arbitrary rather than conducive to the desired function. In other words, spoon-type lures have been made with various forms or details, but the action thereof when drawn through the water was either devoid of the realistic effect contemplated, or included characteristics which were undesirable, such as spinning, overturning, etc. It has therefore been my intention to develop a lure of the above character whose structural features actually produce the desired effect.

In accordance with the foregoing, specific reference to the drawing indicates the main or spoon portion of the novel lure at 10. As indicated in Fig. 4, the rear portion 11 of the spoon is of a regular concavo-convex or crescent form, but as the body of the spoon develops, the base thereof is substantially flat in cross section, as indicated at 12, the sides 13 rising with gradual curvatures from the base. However, Fig. 6 shows that the forepart of the spoon is tapered both from above and from the sides to a flat portion 14 which continues to the front end or tip 15 of the lure as shown.

The structural characteristics of the spoon as just described serve to lend it the desired motion as it is drawn through the water. Thus, the cup-like formation 11 imparts the rocking or rolling motion, while the flat-bottom portion 12 with its side walls 13 induces the wiggling or oscillatory movement. However, in order that the spoon may be steadied against tendencies to turn it over or spin it, I have provided a weight at the front end in the form of a relatively heavy plate 16. The spoon itself could be made with the weight in a single piece, but I have found such a method expensive or wasteful, preferring to make the spoon of sheet metal, first—for the reason that it may be pressed more readily and accurately to the proper form, second—because the material is light, and third—because the plate 16 can be easily soldered, welded or otherwise secured to the front end portion of the spoon. Thus, with the spoon weighted as described, its equilibrium is maintained, so that it keeps its upright position while drawn through the water. The plate 16 and the forward portion of the spoon are perforated in registration as indicated at 17 for the application of the usual ring 18 to which the line is attached.

In some lures of the spoon type it is customary to dispose the hook longitudinally along the center of the lure by starting the shank of the hook above the lure at a frontal point and passing it under the lure to emerge and return over the top with the bill. I have shown a similar application of the hook, the shank thereof being indicated at 20, the necessary slot in the base of the spoon at 21 for the submergence of the hook shank and the final bill portion at 22. However, I employ an improved means for securing the eye 23 of the hook to the spoon.

As indicated in Fig. 1, the plate 16 is divided from its rear edge as shown at 24 to allow an ample clearance for the hook eye 23. The latter lies over the flat portion 14 of the spoon, but such portion is extruded in an upward direction to form a rounded seat 25 for the inner side and bottom of the eye. The extruded portion is vertically tapped to receive a screw 26 from the top, the head 27 of the screw overlying the eye and serving to clamp the same tightly to the spoon. The extruded portion of the latter thus provides an ample bearing for the screw and facilitates such bearing to be made from the sheet metal spoon material.

It is advantageous in a lure of the above character to provide a weed guard, and the same is indicated in the form of a stem 28 which extends longitudinally over the lure, tapering in thickness and terminating with a flared tip 29. The shank of the weed guard is formed with a downward curve 30 at the front, terminating with a bottom hook 31. The plate 16 is perforated at 32 to permit the passage of the hook 31 to underlie the plate; and the spoon portion 14 is formed with a depression 33 to afford a pocket for the hook 31 and permit the same to become firmly clamped to the spoon when the plate 16 is secured to the same.

It will be evident from the above description that the novel lure has a number of advantageous and attractive features. Thus the lure is balanced in a manner to hold its course, yet assume both the oscillatory and rolling motions simulative of a minnow. Further, the balancing plate 16 is an independent feature and therefore capable of being dimensioned and shaped in such particulars as will best suit the purpose or size of the lure. Further, the lure can be made inexpensively from sheet metal, yet have the advantage of a weighted front end. Further, the lure being of sheet metal, requires no additional or reinforcing medium for securing the eye of the fish hook, as the extrusion of the affected portion supplies the necessary seat for the eye as well as a sufficient bearing for the securing screw. Further, no extra parts or securing means are required for the weed guard 28, since the base portion of the same is secured between the balancing plate and the spoon and at the same time as these parts are secured to each other. Finally, the novel lure is simple in structure, devoid of complications or expensive parts, and of a nature to be used without trouble or repair over an indefinite period.

While I have described the invention along specific lines, various minor changes or refinements may be made therein from time to time without departing from its principle, and I consider all such changes and refinements as coming within the scope and spirit of the appended claims.

I claim:

1. An artificial fish lure comprising a spoon of sheet material, the forward end portion of the spoon being flat, the rear portion of concavo-convex form, and the intermediate portion with a flat bottom and sides gradually curved in an upward direction.

2. The structure of claim 1, and a balancing plate secured upon the upper face of said forward end portion.

3. The structure of claim 1, and a balancing plate secured upon said forward end portion, said plate being bifurcated from its rear end in a substantially medial zone.

4. An artificial fish lure comprising a spoon having a flat forward end portion, a fish hook extended longitudinally over the lure and with an eye over said forward end portion, and an upward tubular extrusion from the latter receiving the eye around it and with its bottom flush with the bottom surface of said portion.

5. An artificial fish lure comprising a spoon having a flat forward end portion, a fish hook extended longitudinally over the lure and with an eye over said forward end portion, and an upward tubular extrusion having a curved base connecting it with said forward end portion, said extrusion being adapted to receive the eye therearound and seat the same in said curved base.

6. An artificial fish lure comprising a spoon having a flat forward end portion, a fish hook extended longitudinally over the lure and with an eye over said forward end portion, an upward tubular extrusion from the latter of a height less than that of the eye and internally tapped, and a screw threaded in the extrusion, the screw having a head at its upper end, and the head of the screw overlying the eye and clamping the latter to said portion when the screw is in the tightened position.

JOHN NELSON.